United States Patent
Boucqueau et al.

(10) Patent No.: US 10,229,278 B2
(45) Date of Patent: Mar. 12, 2019

(54) DEVICES AND METHODS FOR ENCRYPTION AND DECRYPTION OF GRAPHICAL 3D OBJECTS

(71) Applicant: THOMSON LICENSING, Issy les Moulineaux (FR)

(72) Inventors: Jean-Marc Boucqueau, Mouaze (FR); Marc Joye, Palo Alto, CA (US); Marc Eluard, Acigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 47 days.

(21) Appl. No.: 15/089,510

(22) Filed: Apr. 2, 2016

(65) Prior Publication Data
US 2016/0292439 A1    Oct. 6, 2016

(30) Foreign Application Priority Data

Apr. 2, 2015 (EP) .................................... 15305488

(51) Int. Cl.
*H04L 29/06* (2006.01)
*G06F 21/62* (2013.01)
(Continued)

(52) U.S. Cl.
CPC ........ *G06F 21/6209* (2013.01); *G06F 21/602* (2013.01); *G09C 5/00* (2013.01); *H04L 9/00* (2013.01)

(58) Field of Classification Search
CPC ..... G06F 21/6209; G06F 21/602; G09C 5/00; H04L 9/00
(Continued)

(56) References Cited

U.S. PATENT DOCUMENTS

| | | | |
|---|---|---|---|
| 8,869,292 B2 | 10/2014 | Eluard | |
| 2007/0196030 A1* | 8/2007 | Grimaud | G06T 17/00 382/276 |

(Continued)

FOREIGN PATENT DOCUMENTS

| | | |
|---|---|---|
| EP | 1221674 A2 | 7/2002 |
| EP | 2453429 A1 | 5/2012 |

(Continued)

OTHER PUBLICATIONS

Kishk, Sherif et al.—"3D object watermarking by a 3D hidden object," Optical Society of America, Apr. 21, 2003 / vol. 11, No. 8 / Optics Express, pp. 874-888.

(Continued)

*Primary Examiner* — Michael S McNally
(74) *Attorney, Agent, or Firm* — Brian J. Dorini; Patricia A. Verlangieri

(57) ABSTRACT

An asset, which is a graphical 3D object, is protected at a processor of an encryption device that obtains the asset and a proxy including polyhedrons, processes points of the asset to obtain transformed points lying within the polyhedrons of the proxy, and outputs a protected asset including the transformed points. A decryption device including a processor decrypts the protected asset by obtaining the transformed points of the protected asset, processing transformed points using a reverse of the transformation to obtain reconstructed points of the asset, and obtaining a reconstructed asset using the reconstructed points.

15 Claims, 6 Drawing Sheets

(51) Int. Cl.
*G09C 5/00* (2006.01)
*H04L 9/00* (2006.01)
*G06F 21/60* (2013.01)

(58) Field of Classification Search
USPC .......................................................... 713/189
See application file for complete search history.

(56) References Cited

U.S. PATENT DOCUMENTS

| | | | | |
|---|---|---|---|---|
| 2012/0120062 A1* | 5/2012 | Eluard | ...................... | G09C 5/00 345/419 |
| 2013/0305380 A1* | 11/2013 | Diehl | ...................... | G06F 21/60 726/26 |
| 2014/0115345 A1* | 4/2014 | Maetz | ................... | G06F 21/602 713/189 |
| 2014/0139639 A1* | 5/2014 | Wagner | .............. | H04N 13/0253 348/46 |
| 2014/0146047 A1 | 5/2014 | Wu et al. | | |

FOREIGN PATENT DOCUMENTS

| | | |
|---|---|---|
| EP | 2453430 A1 | 5/2012 |
| EP | 2665033 A1 | 11/2013 |
| EP | 2725555 A1 | 4/2014 |
| EP | 2725566 A1 | 4/2014 |
| EP | 2725567 A2 | 4/2014 |
| WO | WO2012000898 A1 | 1/2012 |
| WO | WO2013034530 A1 | 3/2013 |

OTHER PUBLICATIONS

Jolfaei, Alireza et al. "A 3D Object Encryption Scheme Which Maintains Dimensional and Spatial Stability," IEEE Transactions on Information Forensics and Security, IEEE, Piscataway, NJ, US, vol. 10, No. 2, Feb. 1, 2015 (Feb. 1, 2015), pp. 409-422, ISSN: 1556-6013, 001—[retrieved on Jan. 13, 2015] * section IV *.
Urtasun, Raquel et al.—"3D Morphing without User Interaction," Eurographics Symposium on Geometry Processing (2004), EPFL—CVLab, 1015 Lausanne, Switzerland, pp. 1-10.
Mihir Bellare, et al. "Format-Preserving Encryption", pp. 1-25, Selected Areas in Cryptography, May 30, 2009.

* cited by examiner

DEVICES AND METHODS FOR ENCRYPTION AND DECRYPTION OF GRAPHICAL 3D OBJECTS

This application claims the benefit, under 35 U.S.C. § 119 of European Patent Application No. 15305488.7, filed Apr. 2, 2015.

TECHNICAL FIELD

The present disclosure relates generally to digital content protection and in particular to encryption of 3D graphical objects.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Conventional approaches provide many different ways of protecting digital 3D graphical objects.

A first way that works for objects no matter the representation is bulk encryption, i.e. simply inputting the digital file for the object in an encryption device that uses e.g. AES-256 or RSA and treats the file as a sequence of bytes. The result is an essentially random sequence of bytes that cannot be interpreted by a 3D renderer without decryption. Bulk encryption ensures security during transport only.

A second way is point-based protection that works for objects represented by a set of points, usually joined by surfaces. The basic idea is to use reversible techniques to change the position of the points that compose the object. A secret key may be used to limit access to authorized users only. The shape of the output depends of the algorithm that is used. In all cases, the output is an object with aberrant surfaces. Therefore, even though the result is a 3D object, a renderer may have trouble displaying it. Examples of such solutions are found in EP 2453430, U.S. Pat. No. 8,869,292 and EP 2725567.

A third way is surface-based protection. The basic idea is to use reversible techniques to change the definition of the surfaces that compose the object. Examples of reversible techniques are controlled surface exchange and pseudo-random surface addition. A secret key may be used to limit access to authorized users only. As for point-based protection, the shape of the output depends on the algorithm used. In all cases, result is an object with aberrant surfaces. Therefore, even though the result is a 3D object, a renderer may have trouble displaying it. Examples of such solutions are found in WO 2012/000898 and EP 2665033.

A fourth way, described in WO 2013/034530, transforms any sequence of bits, such as the bits of the file of a 3D object, into a dense set of points that forms a 3D object that can be displayed with other 3D objects. This way can be useful to transform any digital object into a 3D object, but due to the technique used, the larger the size, the bigger the risk of point collision as the space of the 'ciphertext' is small.

EP 2725555 presents a way to optimize the rendering of 3D objects protected using a particular point-based protection and surface-based techniques. As mentioned, these techniques output non-standard objects that are very resource consuming to render and for which classic rendering optimization such as rasterization does not work properly. The optimization of EP 2725555 masks a protected object in order to 'hide' the protected object to the renderer, thus making most optimizations usable again.

It will be appreciated that it is desired to have a solution that overcomes at least part of the conventional problems related to protection of graphical 3D objects. The present principles provide such a solution.

SUMMARY OF DISCLOSURE

In a first aspect, the present principles are directed to a method for encrypting a graphical 3D object. A processor of an encryption device obtains the graphical 3D object and a proxy including a set of polyhedrons, the interior of the set being empty, processes points of the graphical 3D object to obtain transformed points lying within the polyhedrons of the proxy, and outputs a protected graphical 3D object including the transformed points.

Various embodiments of the first aspect include:
That the method further includes using a surface reconstruction technique on the transformed points to obtain the protected graphical 3D object; and
That the proxy includes points and surfaces and that the method further includes adding the transformed points to the points and surfaces of the proxy to obtain the protected graphical 3D object.

In a second aspect, the present principles are directed to an encryption device for encrypting a graphical 3D object to obtain a protected graphical 3D object. The device includes an interface configured to output the protected graphical 3D object and a processor configured to obtain the graphical 3D object and a proxy including a set of polyhedrons, the interior of the set being empty, process points of the graphical 3D object to obtain transformed points lying within the polyhedrons of the proxy, and send the protected graphical 3D object including the transformed points to the interface.

Various embodiments of the second aspect include:
That the processor is further configured to use a surface reconstruction technique on the transformed points to obtain the protected graphical 3D object;
That the proxy includes points and surfaces and that the processor is further configured to use add the transformed points to the points and surfaces of the proxy to obtain the protected graphical 3D object; and
That the processor is further configured to encrypt iteratively each point a number of times until the transformed point lies within a polyhedron of the proxy, and to output, for each transformed point, a value equal to the number of times.

In a third aspect, the present principles are directed to a method for decrypting a protected graphical 3D object, the protected graphical 3D object including transformed points, the transformed points resulting from a transformation comprising iterative encryption of points of an original graphical 3D object. A processor of a decryption device obtains the transformed points of the protected graphical 3D object, processes transformed points using a reverse of the transformation to obtain reconstructed points, wherein the reverse comprises iterative decryption of each point a number of times equal to a received value for the point, and obtains a reconstructed graphical 3D object using the reconstructed points.

Various embodiments of the third aspect include:
  That the obtaining includes using a surface reconstruction technique on the reconstructed points to obtain the reconstructed graphical 3D object; and
  That the protected graphical 3D object further includes surfaces of the original graphical 3D object and that the obtaining includes combining the reconstructed points with the surfaces of the original graphical 3D object to obtain the reconstructed graphical 3D object.

In a fourth aspect, the present principles are directed to a decryption device for decrypting a protected graphical 3D object, the protected graphical 3D object including transformed points, the transformed points resulting from a transformation comprising iterative encryption of points of an original graphical 3D object. The decryption device includes an interface configured to receive the protected graphical 3D object and a processor configured to obtain the transformed points of the protected graphical 3D object, process transformed points using a reverse of the transformation to obtain reconstructed points, wherein the reverse comprises iterative decryption of each point a number of times equal to a received value for the point, and obtain a reconstructed graphical 3D object using the reconstructed points.

Various embodiments of the fourth aspect include:
  That the processor is configured to use a surface reconstruction technique on the reconstructed points to obtain the reconstructed graphical 3D object; and
  That the protected graphical 3D object further includes surfaces of the original graphical 3D object and that the processor is configured to combine the reconstructed points with the surfaces of the original graphical 3D object to obtain the reconstructed graphical 3D object.

In a fifth aspect, the present principles are directed to a computer program including program code instructions executable by a processor for implementing the steps of a method according to any embodiment of the first aspect.

In a sixth aspect, the present principles are directed to a computer program including program code instructions executable by a processor for implementing the steps of a method according to any embodiment of the second aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
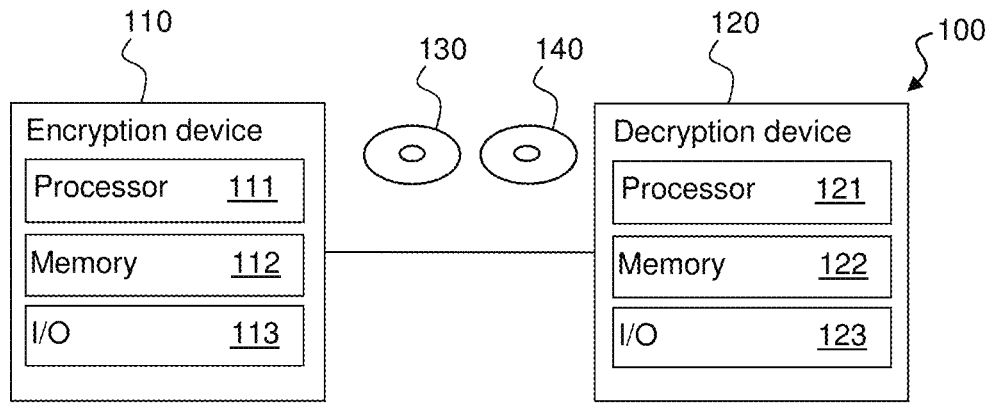
FIG. 1 illustrates a system implementing the present principles.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 illustrates a system 100 implementing the present principles. The system 100 includes an encryption device 110 configured to encrypt a graphical 3D object and a decryption device 120 configured to decrypt an encrypted graphical 3D object. Each device 110, 120 includes at least one hardware processing unit ("processor") 111, 121, memory 112, 122 and at least one communications interface 113, 123 configured to communicate with the other device. The skilled person will appreciate that the illustrated devices are very simplified for reasons of clarity and that real devices in addition would comprise features such as internal connections and power supplies. Non-transitory storage media 130, 140 respectively store instructions that, when executed by a processor, encrypt a graphical 3D object and decrypt an encrypted graphical 3D object as further described hereinafter.

A common way is to define a graphical 3D object as a set of three-dimensional points (P) and a set of surfaces (S) defined on the set of points. The 3D objects of the present principles are defined this way.

Figure 2:
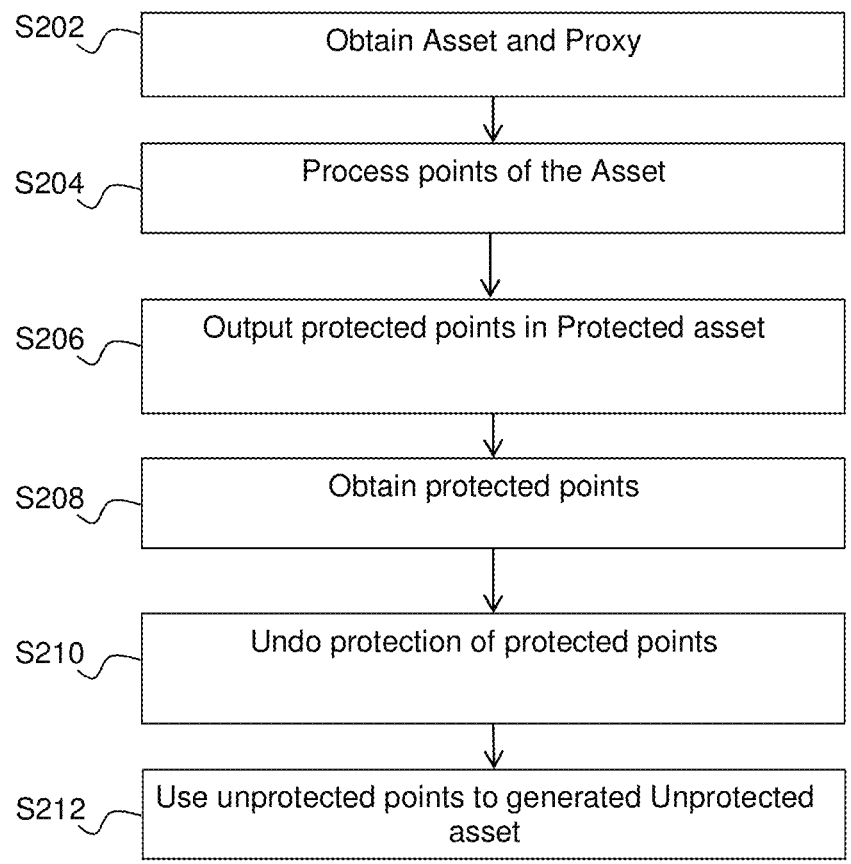
FIG. 2 illustrates a general method according to the present principles.

Generally speaking and as illustrated in FIG. 2, the method includes obtaining by the encryption device 110, in step S202, a first graphical 3D object (called "Asset") and a second graphical 3D object (called "Proxy"). The Proxy is made up of a number of polyhedrons. The points of the Asset are processed, in step S204, preferably using encryption, to obtain a set of protected points, wherein the coordinates of each point is inside (which includes the surface) at least one polyhedron of the Proxy. The set of protected points are then output, in step S206, in a Protected Asset either directly or indirectly (i.e., via a further device) to the decryption device 120. The decryption device 120 obtains, in step S208, the set of protected points from the Protected asset, undoes, in step S210, the protection to obtain the original points, and processes the original points, in step S212, to obtain an Unprotected asset. As will be described hereinafter, the Unprotected asset is not necessarily identical to the Asset.

The Asset is thus protected by hiding it in the Protected asset that is based on the Proxy, which can be defined by the owner of the Asset or by another entity. The Asset and the Proxy can have similar characteristics but they may also be very different. It is thus for example possible to protect a model of a first person, the Asset, in a model of a second person, the Proxy, or to hide a banana in an apple.

Put another way, the protection method uses the Proxy as a guide. Within the Proxy, a function transforms points of the Asset into a set of points within the polyhedrons of the Proxy.

Figure 3:
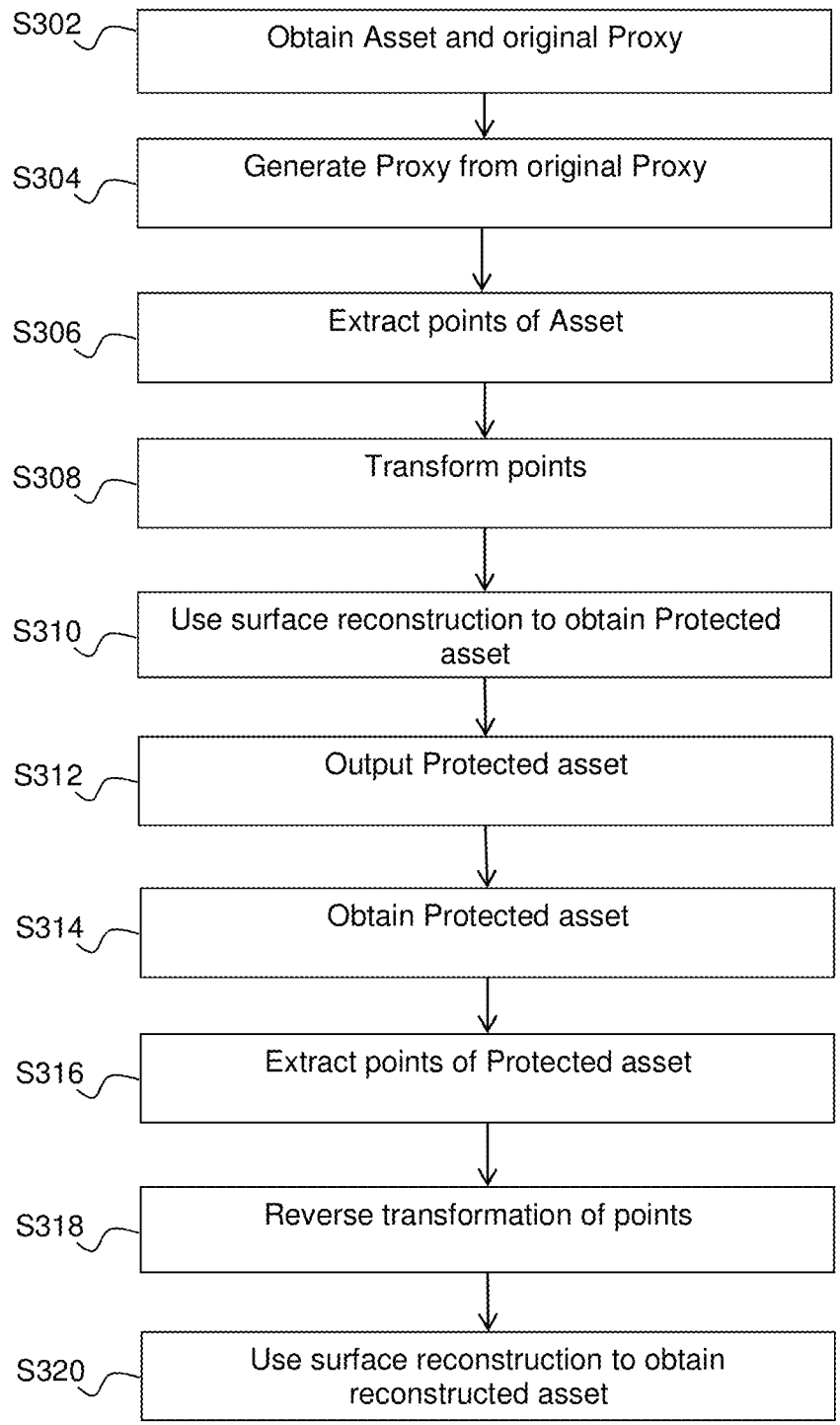
FIG. 3 illustrates a method according to a first embodiment of the present principles.
Figure 4:
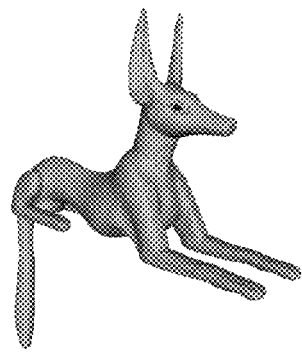
FIG. 4 illustrates an exemplary Asset object.
Figure 5:
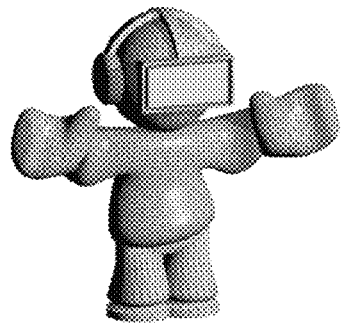
FIG. 5 illustrates an exemplary original Proxy object.

FIG. 3 illustrates a method according to a first embodiment of the present principles. The encryption device 110 obtains, in step S302, an Asset—of which an example is illustrated in FIG. 4—and an original Proxy—of which an example is illustrated in FIG. 5. As mentioned, the Asset and the original Proxy are defined by a set of points and a set of surfaces. The Asset and the original Proxy are visually different when rendered.

Figure 6:
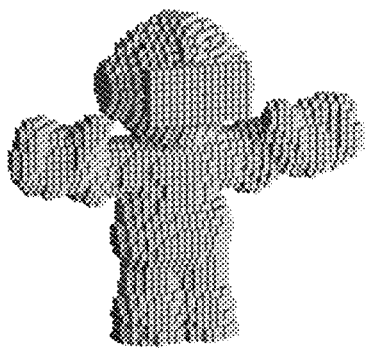
FIG. 6 illustrates a voxel-based Proxy object.

The encryption device 110 then generates, in step S304, a Proxy from the original Proxy by approximation, enclosing the original Proxy in a set of polyhedrons, such as parallelepipeds or pyramids that preferably have the same geometry. It is preferred, in order to facilitate the transformation, that the Proxy is defined in terms of voxels that approximate the surfaces of the Proxy by simple volumes (parallelepipeds). The interior of the set of polyhedrons is preferably empty, but the set of polyhedrons can also occupy the entire volume of the original Proxy. It is advantageous that the polyhedrons enclose the surface of the Proxy. It is noted that the enclosure need not be complete. The polyhedrons are preferably so-called voxels; the generation can then be so-called voxel-based shape decomposition, which is well known in the art. FIG. 6 illustrates a Proxy composed of voxels.

Figure 7:
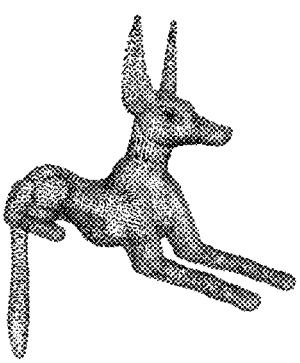
FIG. 7 illustrates the set of points of the Asset object.

The encryption device 110 extracts, in step S306, the points of the Asset (i.e. removes the surfaces). The set of points of the Asset are illustrated in FIG. 7.

Each point of the Asset is then transformed, in step S308, using a reversible technique so that the transformed point lies within a polyhedron in the set. The technique is preferably key based, which is to say that a corresponding key is needed to reverse the transformation. The technique is preferably iterative encryption, as will be further described hereinafter.

Figure 8:
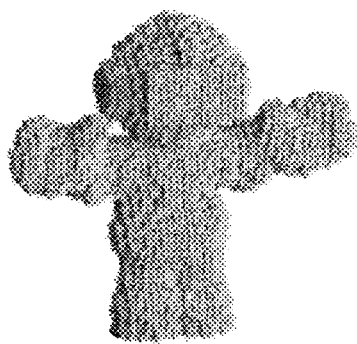
FIG. 8 illustrates a set of transformed points.

The encryption device 110 retains the set of transformed points illustrated in FIG. 8 and the Proxy and the original Proxy are no longer needed.

Figure 9:
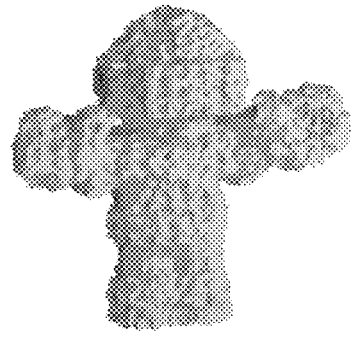
FIG. 9 illustrates a Protected asset object.

The set of transformed points does not make a 3D object on its own since surfaces are needed to obtain a 3D object. The encryption device 110 thus applies a surface reconstruction algorithm to the set of points to obtain a Protected asset, in step S310, illustrated in FIG. 9. Surface reconstruction algorithms are well known in the art and will not be described herein.

It will be appreciated that the Protected asset generally will be visually close to the Proxy when rendered. The level of similarity depends on the dispersion of the transformation and the relationship between the overall surfaces of the Asset and the Proxy.

The encryption device 110 can then output, in step S312, the Protected asset either directly to the decryption device 120 or to a further device (not shown).

To obtain a reconstructed asset from the Protected asset, the decryption device 120 performs at least some of the steps performed by the encryption device in the reverse order. The decryption device obtains the Protected asset, in step S314, extracts the set of points of the Protected asset, in step S316, reverses the transformation to obtain the original points, in step S318, and uses a surface reconstruction technique to obtain a reconstructed asset, in step S320. The reconstructed asset can then for example be rendered. As already mentioned, it will be appreciated that owing to differences between the original surfaces of the Asset and the surfaces obtain by the surface reconstruction, the Asset and the reconstructed asset are not necessarily identical.

It will be noted that with voxel-based shape decomposition, it is not possible that voxels overlap. According to the present principles, it is however possible for the polyhedrons to overlap, an advantage being that this can accelerate the generation of the approximation, i.e., of the Proxy from the original Proxy. Since the polyhedrons are used to indicate the set of valid positions for the transformation, there is therefore no particular reason to force decomposition to obtain non-overlapping elements.

As for the transformation, it should allow changing the points of the Asset to point that lie within a polyhedron of the Proxy. Various algorithms can be used to do so, such as for example cycle-walking cipher or pointification algorithms.

For the cycle-walking cipher algorithm [see M. Bellare et al. *Format-Preserving Encryption*. In *Selected Areas in Cryptography*. Springer], the coordinates c of a point are encrypted using a suitable encryption algorithm (shown below) until the ciphertext are coordinates in a polyhedron. The coordinates of a point can be encrypted together or separately, i.e. by encrypting a first coordinate until the resulting value lies within a polyhedron in the same dimension, then encrypting a second coordinate, etc.

$$F(c) = c' = \left(\overline{\theta(\theta(\overbrace{\ldots}^{n}\theta(c)\ldots)}\right) \bigwedge \exists v \in \text{polyhedron} \mid c' \in v$$

To decrypt correctly, it is necessary to know the number of cycles n for each coordinate. One solution is to transmit the number of cycles n as meta-data. Another solution is to concatenate the number of cycles with the ciphertext, and by ensuring that the same number of digits are used to express n (prefixed, if needed, with a number of 0s). However, the concatenation should be in a polyhedron. Using this solution, encryption is defined by:

$$F(c) = c' = \left(\left(\overline{\theta(\theta(\overbrace{\ldots}^{n}\theta(c)\ldots)}\right) \| n\right) \bigwedge \exists v \in \text{polyhedron} \mid c' \in v$$

Decryption is defined by:

$$G(c = (c' \| n)) = \left(\overline{\gamma(\gamma(\overbrace{\ldots}^{n}\gamma(c')\ldots)}\right)$$

The pointification algorithm, described in detail in WO 2013/034530, is divided into two steps. First a coordinate is interpreted as a number of bits that are transformed as a positive float (here, a coordinate) close to zero. Then this value is translated in order to locate the output in a preselected area (here a polyhedron). It is advantageous to use key-based algorithms (i.e. encryption-based algorithms) for the translation.

The skilled person will also appreciate that in order to optimize the result, it is preferred that the Asset and the Proxy have comparable overall surfaces. If the Proxy is comparatively small, the transformation gives many points close together. In contrast, a comparatively big Proxy will tend to have a dispersed point cloud which can have the result that after the surface reconstruction, the Protected asset is not very close to the Proxy.

Figure 10:
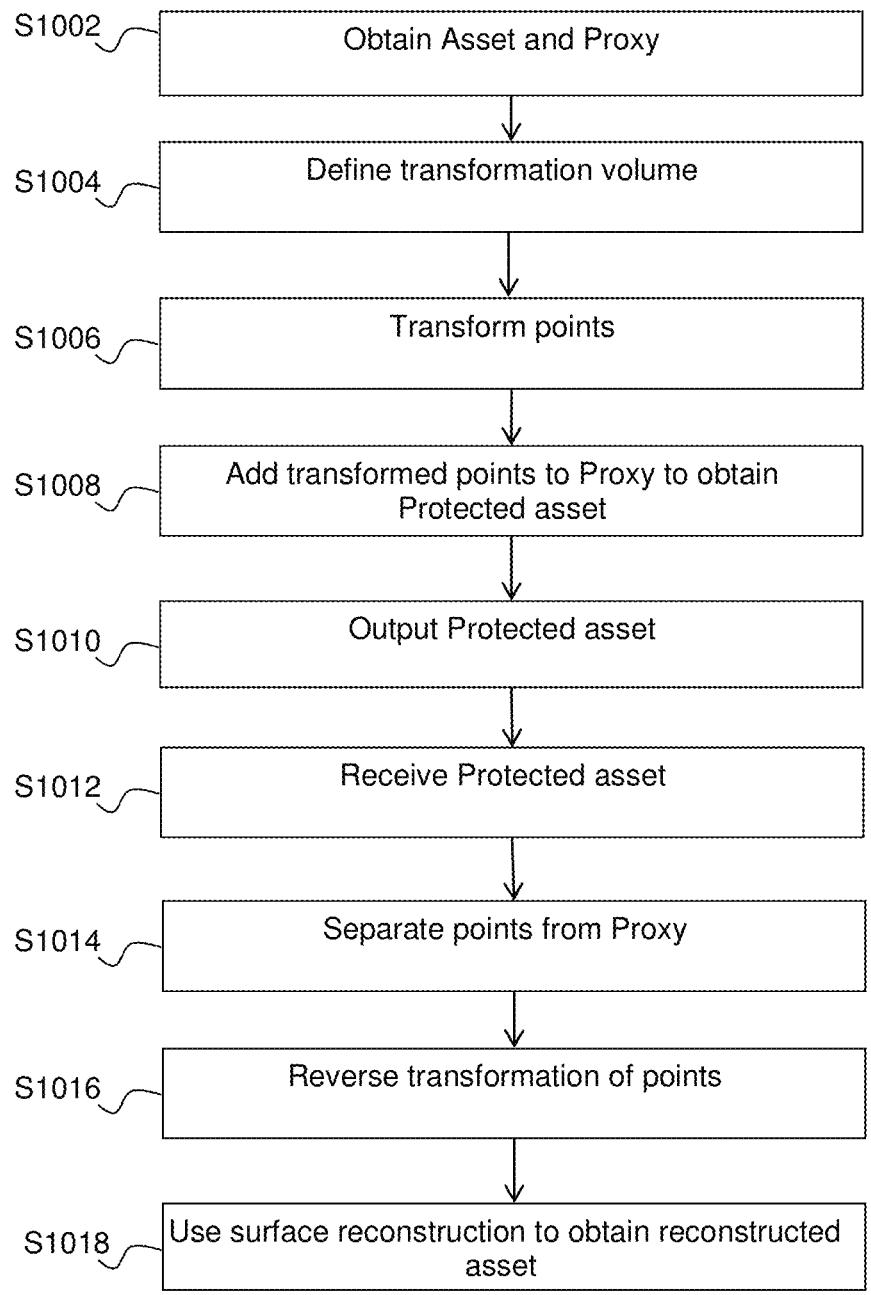
FIG. 10 illustrates a method according to a second embodiment of the present principles.
Figure 11:
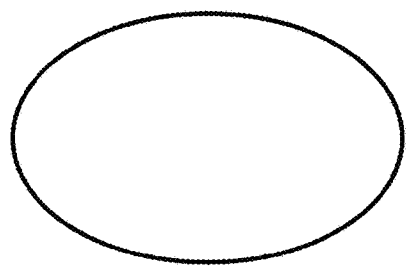
FIG. 11 illustrates a further Proxy object.

FIG. 10 illustrates a method according to a second embodiment of the present principles. The encryption device 110 obtains an Asset, defined by a set of points, $P_A$, and a set of surfaces $S_A$: $A=(P_A,S_A)$ he wants to protect and a Proxy (Pr=($P_{Pr},S_{Pr}$)), in step S1002. The Proxy is illustrated in FIG. 11. The Asset and the Proxy will be used to produce a Protected Asset (PA=($P_{PA}, S_{PA}$))

In step S1004 is defined an authorized volume for the transformation of the points of $P_A$ the Asset. To this end a set R of preferably disjoined parallelepipeds $R_i$ that are contained by the Proxy Pr is defined, as shown below.

$R_i=([x_i^1,x_i^2],[y_i^1,y_i^2],[z_i^1,z_i^2])$:

$\forall p=(x,y,z) \in R_i : x \in [x_i^1,x_i^2] \wedge y \in [y_i^1,y_i^2] \wedge z \in [z_i^1,z_i^2]$
$\wedge p \in P_{Pr}$ The parallelepipeds are disjoined:

$R=\{R_i\}: \forall R_i, R_j \in R: R_i \cap R_j = \emptyset$

Figure 12:
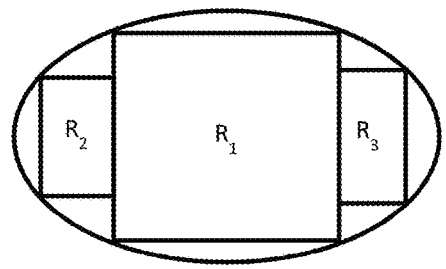
FIG. 12 illustrates the further Proxy object and its authorized volume for transformation.

The Proxy and the set of parallelepipeds is illustrated in FIG. 12.

This set of parallelepipeds composes a global volume $V_R$.

$$\forall R_i = ([x_i^1, x_i^2], [y_i^1, y_i^2], [z_i^1, z_i^2]), V_{R_i} = (x_i^2 - x_i^1) * (y_i^2 - y_i^1) * (z_i^2 - z_i^1)$$

$$V_R = \sum_{i=1}^{m} V_{R_i}$$

A cover threshold, t, is introduced for the ratio between the volume of the Proxy ($V_{Pr}$) and the volume created by the set of $R_i$ ($V_R$). The threshold is used to enforce a minimum volume available to store the transformed points of the Asset.

$$\frac{V_R}{V_{Pr}} \geq t$$

Figure 13:
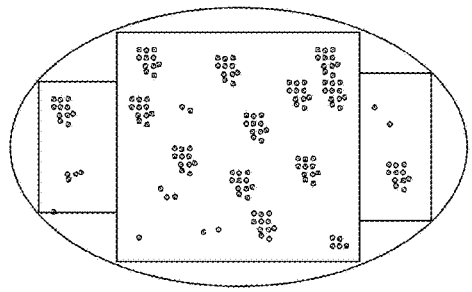
FIG. 13 illustrates Proxy transformed points within a global volume of the Proxy object.

The encryption device then transforms, in step S1006, each point in the set of points $P_A$ of the Asset so that the resulting points lie within the global volume $V_R$. The transformation function F that is used should be bijective to ensure the existence of the inverse function G to be able to restore the original points. FIG. 13 illustrates the transformed points within the global volume $V_R$ of the Proxy.

The transformation function F generates a set of transformed points from the points of the Asset and the set of parallelepipeds R. The transformation function F includes a further transformation function θ that, like in the first embodiment, can be an encryption function or a pointification function. Put another way, the transformation function θ transforms points and the transformation function F verifies that the resulting point lies within the set of parallelepipeds R and, if this is not the case, calls the transformation function θ for another iteration. An integer n is associated with (preferably concatenated || with) each transformed point and represents the number of iterations of the transformation function θ required for the result to lie within an authorized parallelepiped.

$$F(p, R) = \left(\left(\overline{\theta(\theta(\overbrace{\ldots}^{n}(p)\ldots)}\right) \| n\right) = p' \wedge \exists R_i \in R \mid p' \in R_i$$

Figure 14:
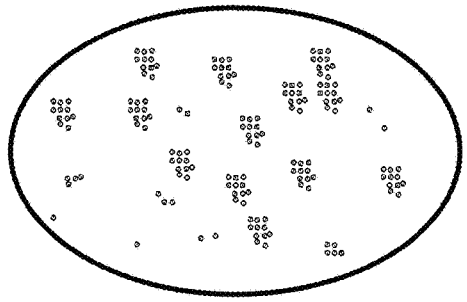
FIG. 14 illustrates a further Protected asset object.

Then the encryption device 110 adds, in step S1008, the points $P_A$ and the surface $S_A$ of the Proxy to the transformed points, creating the Protected Asset ($P_{PA}, S_{PA}$), illustrated in FIG. 14.

Protected asset PA=($\{p \in P_A : P(p,R)\} \cup P_{Pr}, S_{Pr}$)

The encryption device 110 the outputs, in step S1010, the Protected asset that is received by the decryption device 120 in step S1012.

To recover the Asset from the Protected asset, the decryption device 120 extracts, in step S1012, the set of points of the Protected asset—the surfaces $S_{Pr}$ can be discarded from the Protected asset—and separates, in step S1014, the set of points p from the points of the Proxy $P_{PR}$. This is easy to do since the surfaces $S_{Pr}$ define the points of the Proxy $P_{PR}$.

In step S1016, the decryption device 120 reverses the transformation made by the encryption device 110. This is done using the transformation functions G and γ, which undo the transformation made by transformation functions F and θ at the encryption device, 110, to recover the points of original points of the Asset. Transformation function G isolates the coordinates of the transformed points p' from n and iterates, for each transformed point transformation function γ n times:

$$G(p) = G(p' \| n) = \left( \overline{\gamma(\gamma(\ldots \gamma}^{n}(p') \ldots \right) = p''$$

In step S1018, the decryption device 120 uses a surface reconstruction technique on the obtained set of points p" to obtain a reconstructed asset. The reconstructed asset can then be output (e.g., rendered).

It will be appreciated that the number m of parallelepipeds and the global volume $V_R$ may influence the computational resources required by F to protect the Asset. Considering the cover threshold t for the ratio between the volume of the Proxy $V_{Pr}$ and the volume created by the set of $R_i$, $V_R$:

$$\frac{V_R}{V_{Pr}} \geq t$$

This minimizes the number m of parallelepiped and maximize the volume of this set compared to the cover threshold $$\min_m R \bigwedge \max(V_R, t)$$

It will also be appreciated that it may be efficient to permit overlaps between parallelepipeds. In this case, the sum of the volumes of the parallelepiped may be greater than the volume of the Proxy:

$$V_{Pr} \leq \sum_{i=1}^{m} V_{R_i}$$

Figure 15:
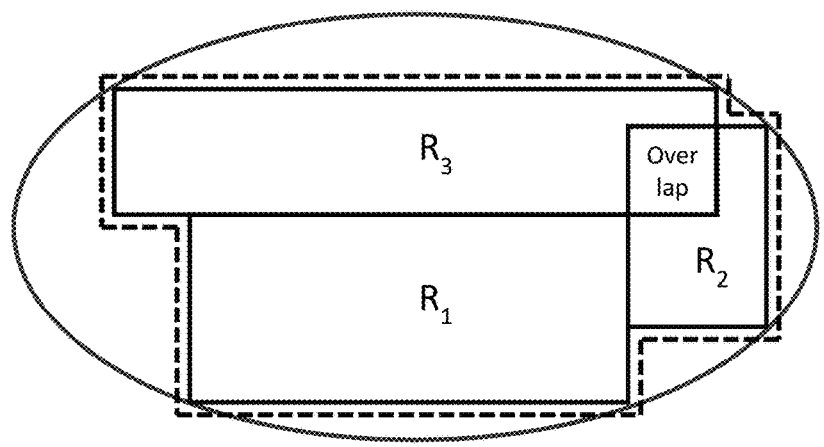
FIG. 15 illustrates a Proxy object with overlapping parallelepipeds.

It may then be useful to use the notion of wrapping volume, $V_w$, which is the volume that wraps the set of $R_i$ as shown in FIG. 15.

An overlap threshold, $t_o$, for the ratio between the Wrapping Volume and the Global Volume, can then be used in order to control the overlap and thus the choice and the number of parallelepipeds:

$$\frac{V_w}{V_R} \geq t_o$$

This threshold can ensure that each parallelepiped contributes to a convex coherent wrap.

Figure 16:
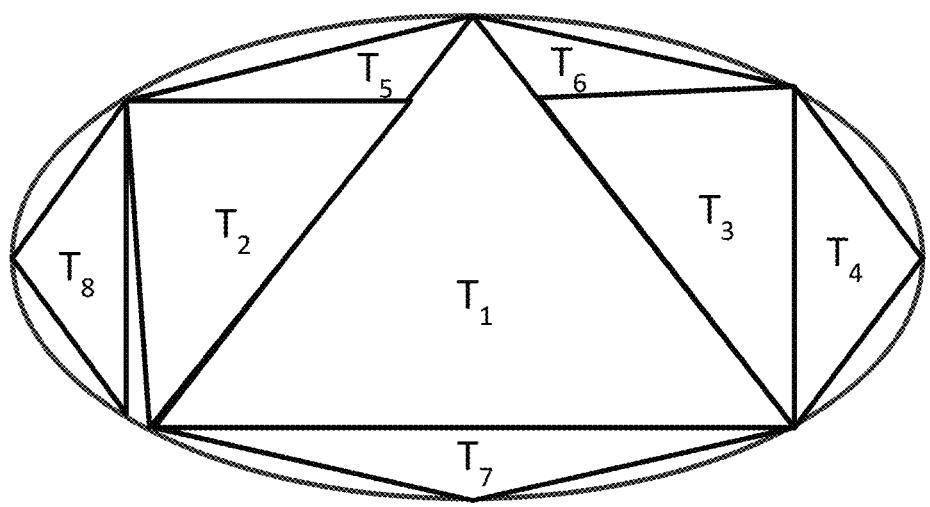
FIG. 16 illustrates a Proxy for which the authorized volume for transformation is made up of triangular pyramids.

It will further be appreciated that polyhedrons other than parallelepiped may be used. FIG. 16 illustrates a Proxy for which the authorized volume for transformation is made up of triangular pyramids.

As already mentioned, transformation functions F and G may be key-based functions. The keys may for example be hardcoded in the rendering software or may be exchanged using a side channel.

The transformation functions F and G advantageously belong to a specific family of encryption/decryption algorithms that ensures appropriate properties: Format-Preserving Encryption, aka FPE. This family of algorithms can thus be used to transform a set of points into another set of points bounded by one box.

$$R = ([x^1, x^2], [y^1, y^2], [z^1, z^2]):$$

$$\forall p = (x, y, z) \in R : x \in [x^1, x^2] \wedge y \in [y^1, y^2] \wedge z \in [z^1, z^2]$$
$$\wedge p \in Pr = (P', S')$$

In this case, for each point of the Asset, the first transformation falls within the authorized volume and, as a consequence, the value n is always equal to 1 and thus redundant.

$$F(p, R) = \theta(p) = p' \wedge p' \in R$$

$$G(p) = \gamma(p)$$

In this case, $\gamma = \theta^{-1}$.

The skilled person will appreciate that any suitable conventional solution can be used for key management.

As already mentioned, it is possible that the surface reconstruction algorithm does not allow exact recovery of the original surfaces of the Asset. In other words, the Asset and the recovered asset are not identical. This is usually due to a non-standard definition of the surfaces of the Asset. To overcome this problem, it is possible to keep the definition of the Asset surfaces in the Protected asset. Before decryption, the definition of the Asset surfaces is removed, and then reapplied to the reconstructed points. In other words, the already existing surfaces and the reconstructed points are used to create the recovered asset. There is then no need to resort to surface reconstruction. Several state of the art techniques can be used to differentiate the two sets of surfaces. If the Proxy is not convex, it is possible that the original surfaces create artifacts in the Protected asset on convex parts.

It will thus be appreciated that the present principles provide a solution for protection of a graphical 3D object that, at least in certain cases, can improve on the conventional protection methods. In particular, depending on the embodiment, the present solution can:

Optimize security vs. usability vs. rendering performances

Avoid oversized bandwidth and storage

Be compliant with standard rendering devices and methods

Provide a single object for Asset and Protected Asset (i.e., no additional points are added)

Provide good visual matching between the Proxy and the Protected Asset when rendered.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method for encrypting a graphical 3D object, the method comprising, at an encryption device:
   obtaining, at a communication interface, the graphical 3D object;
   obtaining a proxy comprising a set of polyhedrons, the interior of the set being empty;
   processing, by a processor, points of the graphical 3D object to obtain transformed points lying within the polyhedrons of the proxy;
   retaining the transformed points of the graphical 3D object in a memory; and
   outputting, by the communication interface, a protected graphical 3D object comprising the transformed points to a decryption device for rendering.

2. The method of claim 1, further comprising using a surface reconstruction technique on the transformed points to obtain the protected graphical 3D object.

3. The method of claim 1, wherein the proxy comprises points and surfaces and the method further comprises adding the transformed points to the points and surfaces of the proxy to obtain the protected graphical 3D object.

4. An encryption device for encrypting a graphical 3D object to obtain a protected graphical 3D object, the device comprising:
   an interface that obtains the graphical 3D object and a proxy comprising a set of polyhedrons, the interior of the set being empty; and
   a processor that processes points of the graphical 3D object to obtain transformed points lying within the polyhedrons of the proxy; and
   retains the transformed points of the graphical 3D object in a memory, wherein the interface outputs the protected graphical 3D object comprising the transformed points to to a decryption device for rendering.

5. The encryption device of claim 4, wherein the processor is further configured to use a surface reconstruction technique on the transformed points to obtain the protected graphical 3D object.

6. The encryption device of claim 4, wherein the proxy comprises points and surfaces and wherein the processor is further configured to add the transformed points to the points and surfaces of the proxy to obtain the protected graphical 3D object.

7. The encryption device of claim 4, wherein the processor is further configured to encrypt iteratively each point a number of times until the transformed point lies within a polyhedron of the proxy, and to output, for each transformed point, a value equal to the number of times.

8. A method for decrypting a protected graphical 3D object, the method comprising at a processor of a decryption device:
   obtaining, at a communications interface, transformed points of the protected graphical 3D object comprising transformed points lying within a polyhedron of a proxy, the transformed points resulting from a transformation comprising iterative encryption of points of an original graphical 3D object;
   processing, by a processor, the transformed points using a reverse of the transformation to obtain reconstructed points, wherein the reverse comprises iterative decryption of each point a number of times equal to a received value for the point; and
   obtaining a reconstructed graphical 3D object using the reconstructed points for rendering.

9. The method of claim 8, wherein the obtaining comprises using a surface reconstruction technique on the reconstructed points to obtain the reconstructed graphical 3D object.

10. The method of claim 8, wherein the protected graphical 3D object further comprises surfaces of the original graphical 3D object and wherein the obtaining comprises combining the reconstructed points with the surfaces of the original graphical 3D object to obtain the reconstructed graphical 3D object.

11. A decryption device for decrypting a protected graphical 3D object, the decryption device comprising:
   a communications configured to receive the protected graphical 3D object comprising transformed points lying within a polyhedron of a proxy, the transformed points resulting from a transformation comprising iterative encryption of points of an original graphical 3D object; and
   a processor configured to:
      process the transformed points using a reverse of the transformation to obtain reconstructed points, wherein the reverse comprises iterative decryption of each point a number of times equal to a received value for the point; and
      obtain a reconstructed graphical 3D object using the reconstructed points for rendering.

12. The decryption device of claim 11, wherein the processor is configured to use a surface reconstruction technique on the reconstructed points to obtain the reconstructed graphical 3D object.

13. The decryption device of claim 11, wherein the protected graphical 3D object further comprises surfaces of the original graphical 3D object and wherein the processor is configured to combine the reconstructed points with the surfaces of the original graphical 3D object to obtain the reconstructed graphical 3D object.

14. A non-transitory storage medium on which is stored instructions of an application that when executed by a processor causes the processor to:
   obtain a graphical 3D object;
   obtain a proxy comprising a set of polyhedrons, the interior of the set being empty;
   process points of a graphical 3D object to obtain transformed points lying within the polyhedrons of the proxy;
   retain the transformed points of the graphical 3D object in a memory; and
   output a protected graphical 3D object comprising the transformed points to a decryption device for rendering.

15. A non-transitory storage medium on which is stored instructions of an application that when executed by a processor causes the processor to:
   obtain transformed points of a protected graphical 3D object comprising transformed points lying within a polyhedron of a proxy, the transformed points resulting from a transformation comprising iterative encryption of points of an original graphical 3D object;
   process the transformed points using a reverse of the transformation to obtain reconstructed points of the graphical 3D object, wherein the reverse comprises iterative decryption of each point a number of times equal to a received value for the point; and
   obtain a reconstructed graphical 3D object using the reconstructed points for rendering.

* * * * *